(12) United States Patent
Weldele et al.

(10) Patent No.: US 8,985,449 B2
(45) Date of Patent: Mar. 24, 2015

(54) MAGNETIC STRIPE READER

(75) Inventors: Mark Henry Weldele, McKinney, TX (US); Sung Ung Kwak, Frisco, TX (US); Gary Vernon Zanders, Fairview, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 86 days.

(21) Appl. No.: 13/610,103

(22) Filed: Sep. 11, 2012

(65) Prior Publication Data

US 2014/0070006 A1    Mar. 13, 2014

(51) Int. Cl.
*G06K 7/08* (2006.01)
*G11B 5/008* (2006.01)
*G11B 5/09* (2006.01)

(52) U.S. Cl.
CPC .......... *G06K 7/084* (2013.01); *G11B 5/00808* (2013.01); *G11B 5/09* (2013.01)
USPC ........................................ 235/449; 235/435

(58) Field of Classification Search
CPC ........ G06K 7/084; G06K 7/087; G06K 17/00
USPC ........................................ 235/449, 435, 493
See application file for complete search history.

(56) References Cited

U.S. PATENT DOCUMENTS

| 4,486,653 | A * | 12/1984 | Powell ........................... 235/449 |
| 5,168,275 | A * | 12/1992 | Harrison et al. ................. 341/71 |
| 5,452,143 | A * | 9/1995 | Kamagami ....................... 360/2 |
| 7,163,148 | B2 * | 1/2007 | Durbin et al. .................. 235/449 |
| 8,210,440 | B1 * | 7/2012 | Pinai .............................. 235/494 |
| 8,356,759 | B2 * | 1/2013 | Pinai .............................. 235/494 |
| 2005/0219728 | A1 * | 10/2005 | Durbin et al. .................... 360/46 |
| 2007/0139802 | A1 * | 6/2007 | Kuribayashi et al. ........... 360/39 |
| 2011/0084140 | A1 * | 4/2011 | Wen ............................... 235/449 |
| 2012/0095868 | A1 * | 4/2012 | McKelvey ................. 705/26.41 |
| 2012/0235740 | A1 * | 9/2012 | Pinai .............................. 330/129 |
| 2013/0026218 | A1 * | 1/2013 | Miller ........................... 235/375 |
| 2013/0126613 | A1 * | 5/2013 | Hsu ............................... 235/438 |

* cited by examiner

*Primary Examiner* — Paultep Savusdiphol
(74) *Attorney, Agent, or Firm* — North Weber & Baugh LLP (57) ABSTRACT

The invention relates to a magnetic stripe reader, and more particularly, to systems, devices and methods of directly extracting binary information embedded in a magnetic stripe using simple analog and digital signal processing techniques. Once information stored in the magnetic stripe is extracted as a F-2F waveform by the magnetic stripe reader, peaks, valleys and mid-level transition points between every consecutive peak and valley are detected. A peak-to-peak period and an average time are directly derived to determine whether the corresponding peak-to-peak transition is associated with a binary bit of "1" or "0". This magnetic stripe reader spares a need for a multi-bit analog-to-digital converter (ADC) and a large memory, and thus, constitutes a simple and self-contained solution that may read out the binary information stored on the magnetic stripe with reduced power consumption and improved cost efficiency.

20 Claims, 10 Drawing Sheets

MAGNETIC STRIPE READER

BACKGROUND

A. Technical Field

The present invention relates to a magnetic stripe reader, and more particularly, to systems, devices and methods of directly extracting binary information embedded in a magnetic stripe using simple analog and digital signal processing techniques. This magnetic stripe reader spares a need for a multi-bit analog-to-digital converter (ADC) and a large memory, and thus, constitutes a simple and self-contained solution that reads out the binary information on the magnetic stripe with reduced power consumption and improved cost efficiency.

B. Background of the Invention

A magnetic stripe is widely applied to carry secure information related to financial transactions or personal identity. Secure information is coded into magnetic tracks on the magnetic stripes according to an international standard or a custom protocol compliant with a specific application and industry. A typical magnetic stripe contains three parallel tracks that have a recording density of 75 bits per inch or 210 bits per inch. To date, the magnetic stripe has been embedded in driver's licenses, credit and debit cards, gift or cash cards, loyalty cards, telephone cards, hotel keycards, membership cards, food stamps and many other cards for use in various applications.

Figure 1:
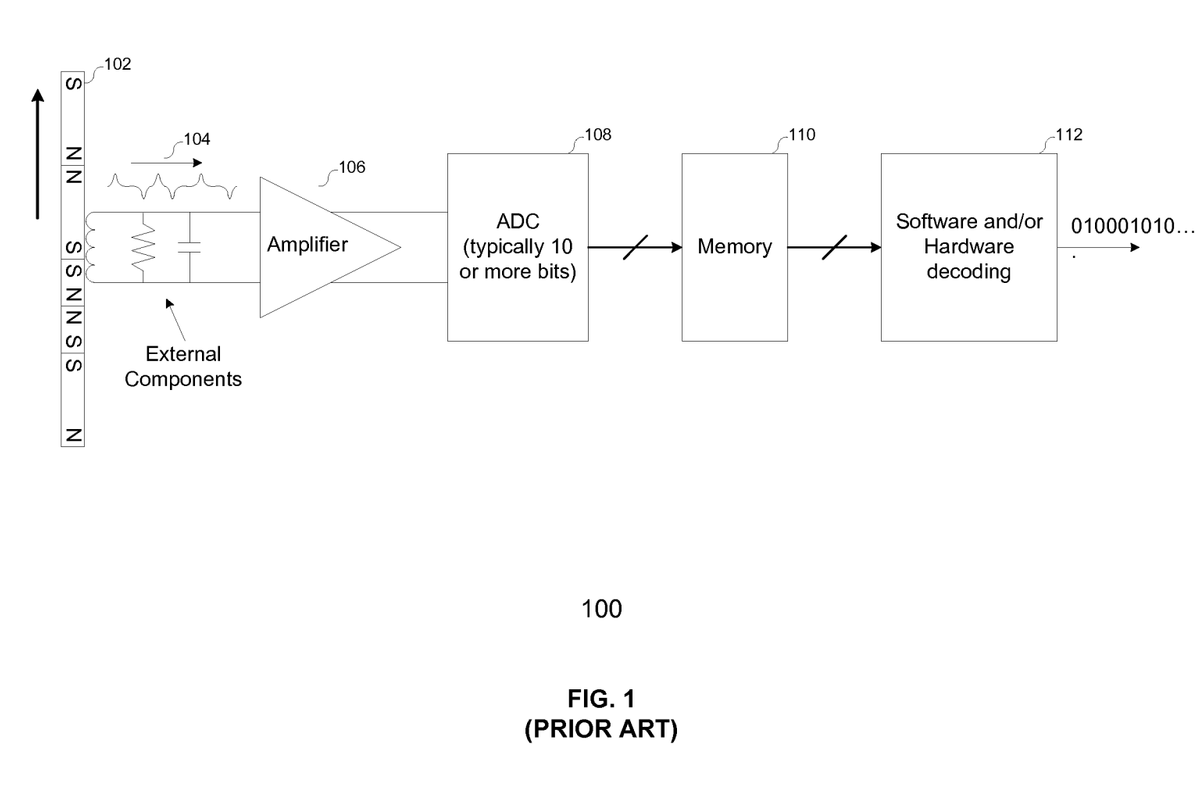
FIG. 1 illustrates a block diagram for a conventional magnetic card reading system.
Figure 2:
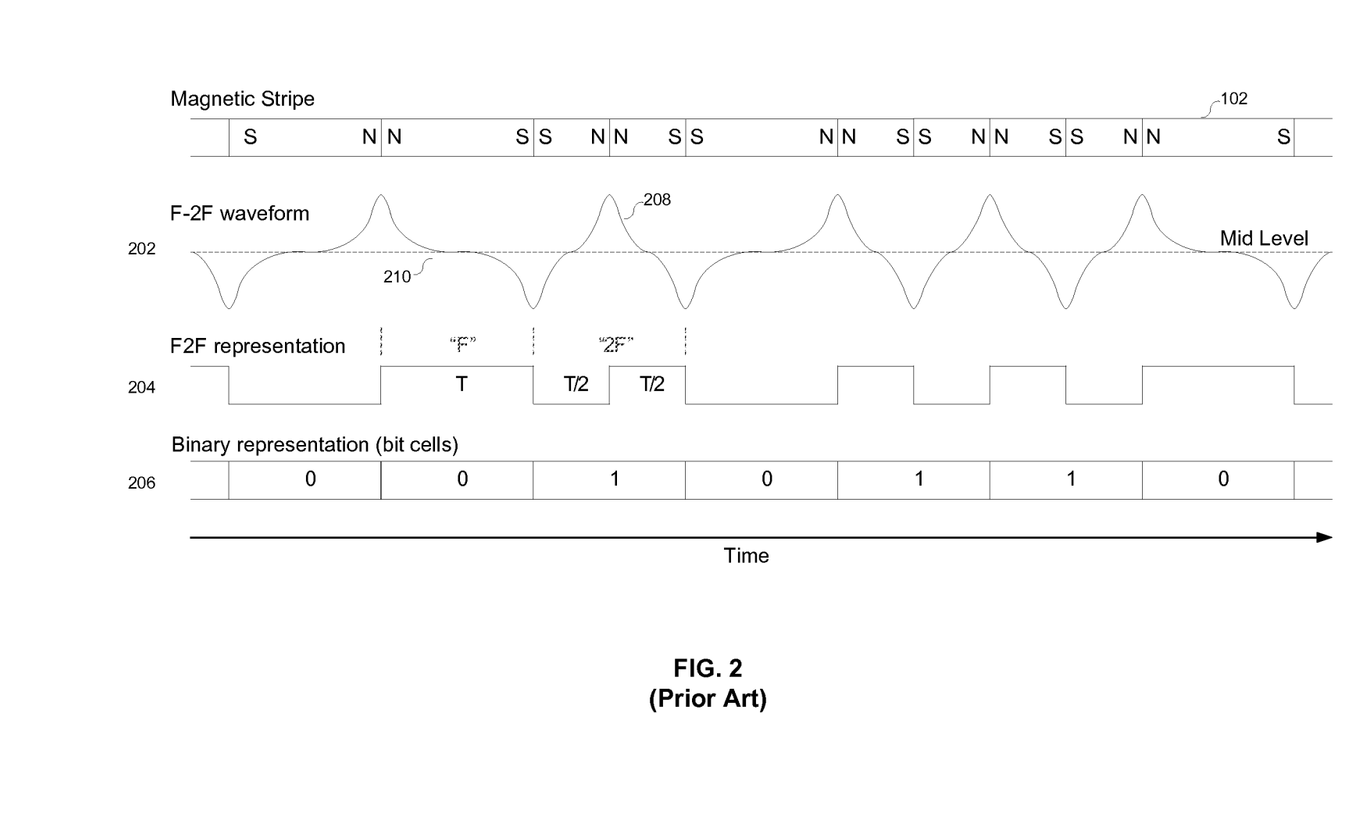
FIG. 2 illustrates time diagrams for relevant signals that are recovered and processed by the conventional magnetic card reading system.

Secure information is extracted from the magnetic stripe by physically contacting with or swiping past a magnetic reading head included in a magnetic card reading system. FIG. 1 illustrates a block diagram 100 for a conventional magnetic card reading system, and FIG. 2 illustrates time diagrams 202-204 for relevant signals that are recovered and processed by the conventional magnetic card reading system 100. A magnetic stripe 102 stores multiple bits of data in a band of magnetic material. When the magnetic stripe 102 is swiped through a magnetic reader head (MRH) 104, the MRH 104 detects variation of the magnetic field associated with the magnetic stripe 102. The MRH 104 is commonly made of a coil that is characterized by its parasitic inductance, capacitance and resistance. In the prior art, the MRH 104 is normally coupled with discrete passive components, such that an electrical signal 202 may be properly induced by the MRH 104 in response to the magnetic field. The electrical signal 202 is referred to as a bi-phasic or two frequency (F/2F) data signal, i.e., a F-2F waveform 202, since it alternates between positive and negative flux peaks that are temporally spaced at two characteristic periods, T and T/2. Two sequential T/2 periods 208 are associated with a data bit of "1" while one T period is associated with a data bit of "0".

The electrical signal 202 is amplified in an amplifier 106, and further sampled and converted to a multi-bit digital signal in an analog-to-digital converter (ADC) 108. The multi-bit digital signal tracks the magnitude of an amplified F-2F waveform according to a sampling frequency. This multi-bit digital signal may be stored in a memory 110 temporarily, and ultimately recovered by a software or hardware decoding block 112 to a digital output 206. The digital output 206 forms a binary bit stream of data that is consistent with the multiple bits of data stored within the magnetic stripe 102.

Both amplitude and frequency of the F-2F waveform 202 may vary by orders of magnitudes. Existing magnetic card reader solutions tackle this challenge by using a large number of external components, using more power or overdesigning. One can loosely divide existing solutions into either analog or digital. In the so-called analog solutions, an overwhelming majority of the read F-2F waveform is processed and decoded continuously using analog functions. This requires additional quiet power supplies, additional pins and a fairly large amount of external components, resulting in a bulky, expensive and power-hungry magnetic card reader system.

On the other hand, digital solutions rely on digital signal processing (DSP) techniques to process and decode the F-2F waveform, and do not require many external components. FIG. 1 illustrates an example of such a digital solution. However, a multi-bit ADC is required to digitize the analog waveform, and a large memory device is needed to store the digitized waveform. To accommodate the large amplitude variations, high-resolution ADCs are applied, and the resolution is higher than what is actually needed for most situations. One extra bit in an ADC increases the area, doubles data to be processed and stored, and quadruples the power consumed by the ADC 108. The digital solutions are inefficient from both perspectives of signal processing and power consumption.

Therefore, despite acceptable performance, most conventional magnetic card readers are plagued by many problems including high cost, large hardware footprint, and large power consumption. A better solution is needed to address the main issues, including cost, hardware footprint and power, with existing magnetic card reader solutions, and particularly, for those low-power applications powered by batteries.

SUMMARY OF THE INVENTION

Various embodiments of the present invention relate to a magnetic stripe reader, and more particularly, to systems, devices and methods of directly extracting binary information embedded in a magnetic stripe using simple analog and digital signal processing techniques. This magnetic stripe reader spares a need for a multi-bit ADC and a large memory, and thus, constitutes a simple and self-contained solution that may read out the binary information on the magnetic stripe with reduced power consumption and improved cost efficiency.

One aspect of the invention is a magnetic stripe reader that converts binary information stored in the magnetic card to a stream of digital data. A stripe interface is coupled to a magnetic card to generate a F-2F waveform. A zero-cross detector detects a plurality of zero cross events when the F-2F waveform crosses a mid-level transition point located between each adjacent peak and valley pair, and a peak detector tracks the F-2F waveform as it reaches each peak and valley. A frequency analyzer stamps peaks and valleys in the F-2F waveform, calculates a plurality of peak-to-peak periods for a plurality of adjacent peak and valley pairs, and derives a bit time based on the plurality of peak-to-peak periods. A bit decoder generates a stream of digital data according to the plurality of peak-to-peak periods and the bit time.

Another aspect of the invention is a method of reading a magnetic stripe. A F-2F waveform is extracted from binary information stored in the magnetic card. Zero cross events, peaks and valleys are detected in the F-2F waveform. A plurality of peak-to-peak periods is calculated for a plurality of adjacent peak and valley pairs, such that a bit time is derived and updated based on the plurality of peak-to-peak periods. As a result, a stream of digital data is generated according to the plurality of peak-to-peak periods and the bit time.

Another aspect of the invention is a method converting a F-2F waveform to a stream of digital data. The F-2F waveform alternates between peaks and valleys at two frequencies including a first frequency and a second frequency that doubles the first frequency. Peaks and valleys are detected in the F-2F waveform. A plurality of peak-to-peak periods is generated for adjacent peak and valley pairs, such that a bit time is derived based on the plurality of peak-to-peak periods. The stream of digital data is generated according to the plurality of peak-to-peak periods and the bit time. In particular, a peak-to-peak period at the first frequency is associated with a bit of "0" and two consecutive peak-to-peak periods at the second frequency is associated with a bit of "1".

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the invention relates to a magnetic stripe reader, and more particularly, to systems, devices and methods of directly extracting binary information embedded in a magnetic stripe using simple analog and digital signal processing techniques. An F-2F waveform is extracted from the magnetic stripe, and locations are identified for of each pair of adjacent peak and valley, and a mid-level transition point that separates each pair in the F-2F waveform. The binary information is subsequently decoded directly from the locations of the peak, valley and transition point. Such mixed signal processing techniques spare a need for a multi-bit analog-to-digital converter (ADC) and a large memory, and particularly, adoption of current-mode techniques conveniently avoids a need of extra analog power pins and external components. As a result, the magnetic stripe reader in this invention constitutes a simple and self-contained solution that may read out the binary data on the magnetic stripe with reduced power consumption and improved cost efficiency.

Figure 3:
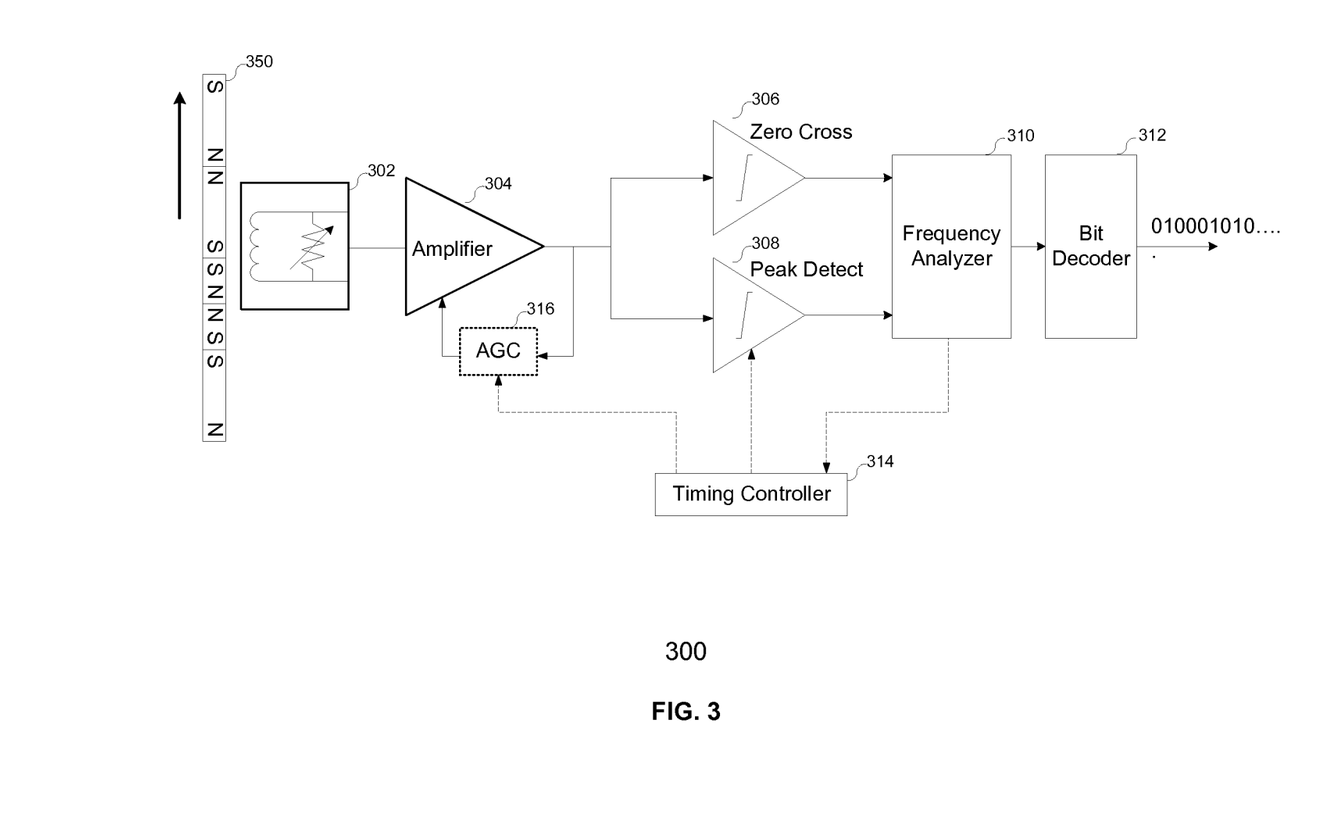
FIG. 3 illustrates an exemplary block diagram of a magnetic stripe reader according to various embodiments in the invention.

FIG. 3 illustrates an exemplary block diagram 300 of a magnetic stripe reader according to various embodiments in the invention. The magnetic stripe reader 300 is coupled to read out a binary data embedded in a magnetic stripe 350, and converts the binary data to a stream of digital data. This magnetic strip reader 300 comprises a stripe interface 302, an amplifier 304, a zero-cross detector 306, a peak detector 308, a frequency analyzer 310, a bit decoder 312 and a timing controller 314. In this magnetic stripe reader 300, the timing controller 300 functions as a central processing unit that controls and synchronizes operation of the peak detector 308, the frequency analyzer 310, and an AGC 316 that is optionally used to control the gain of the amplifier 304.

Figure 4:
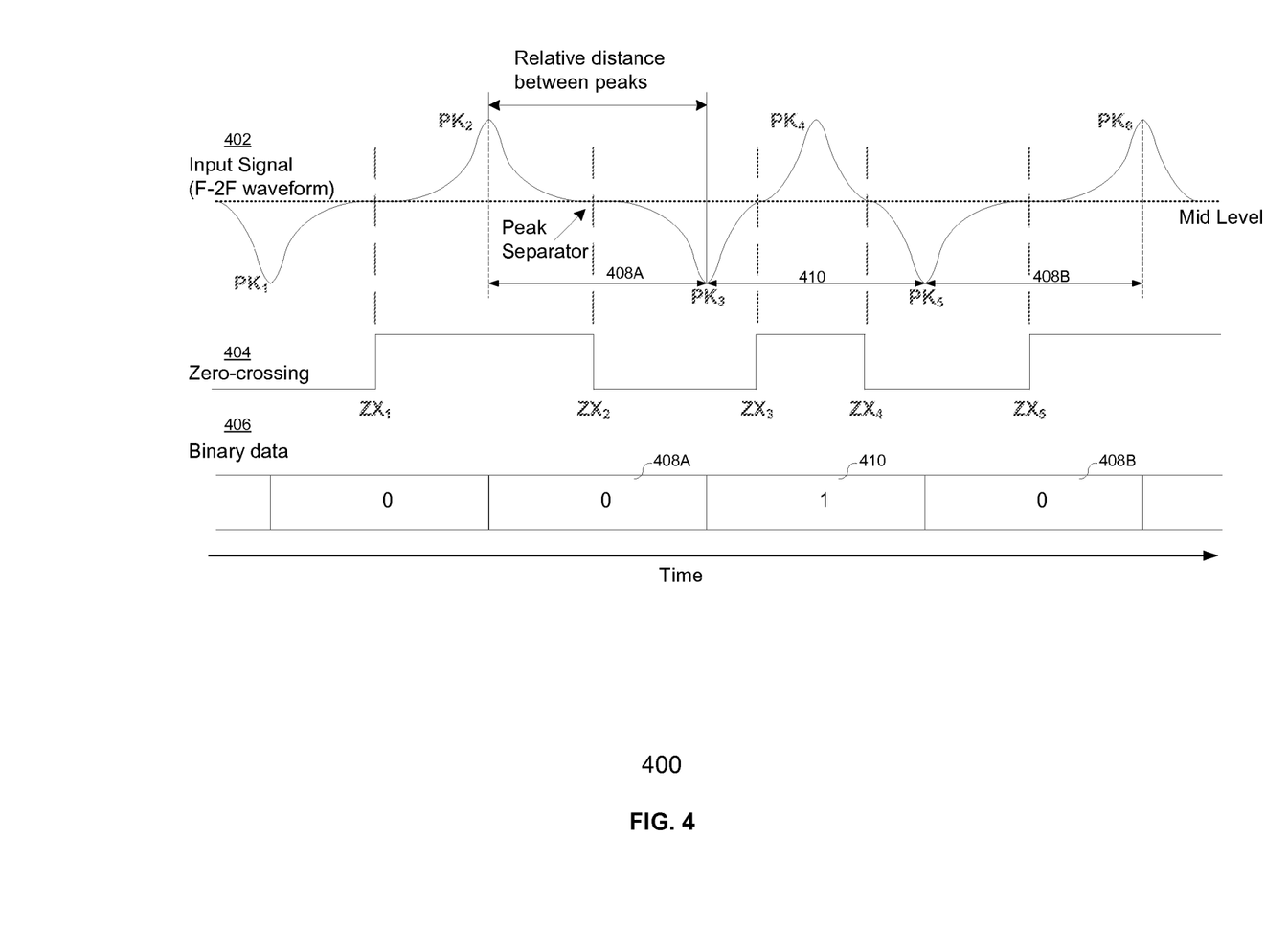
FIG. 4 illustrates exemplary time diagrams of a F-2F waveform, a zero-crossing signal and a stream of digital data according to various embodiments in the invention.

FIG. 4 illustrates exemplary time diagrams of a F-2F waveform 402, a zero-crossing signal 404 and a stream of digital data 406 according to various embodiments in the invention. The stripe interface 302 is coupled to the magnetic stripe 350, and generates an analog signal, i.e., the F-2F waveform 402, from the binary data that is stored in a magnetic format within the magnetic stripe 350.

The F-2F waveform 402 alternates between peaks and valleys. In various embodiments of the present invention, an adjacent peak and valley pair involves a peak, i.e., a positive flux peak, and a valley, i.e., a negative flux peak. The adjacent peak and valley pair may be associated with either a peak-to-valley transition or a valley-to-peak transition. The transition time for either type of transition is generally referred to as a peak-to-peak period. The peak-to-peak period in the F-2F waveform is substantially associated with two frequencies, $f_{HIGH}$ and $f_{LOW}$. The high frequency $f_{HIGH}$ approximately doubles the low frequency $f_{LOW}$. Both a peak-to-valley transition 408A and a valley-to-peak transition 408B at the frequency of $f_{LOW}$ is associated with a "F" period and a digital bit of "0", while two consecutive transitions 410 at the frequency of $f_{HIGH}$ are associated with two "2F" periods and a digital bit of "1".

The F-2F waveform 402 may be amplified by the amplifier 304. In certain embodiments, the amplifier 304 is directly incorporated in the stripe interface 302. The peak detector 308 further tracks the F-2F waveform to reach the peaks and valleys, while the zero-cross detector 306 determines the zero-crossing signal 404. Each transition edge of the zero-crossing signal 404 indicates a zero cross event when the F-2F waveform crosses a mid-level transition point between every pair of adjacent peak and valley. The frequency analyzer 310 timestamps the peaks and valleys in the F-2F waveform according to a clock signal, tracks a peak-to-peak period, and updates a bit time that is used to differentiate the "F" and "2F" periods. The bit decoder 312 further recovers the stream of digital data 406 from the peak-to-peak period for the peaks and valleys based on the updated bit time provided by the frequency analyzer 310.

Amplitude and frequency of the F-2F waveform 402 may vary significantly among stripes, swiping operations, and stripe readers. In some embodiments, the amplitude levels vary by as much as 50 times, while the frequency variations reach 1000 times. Most signal variations are caused by magnetic field strength variation associated with quality and physical condition of the magnetic stripe 102, variation of swiping speeds and styles from one card holder to another, configuration of the MRHs, data rates among different tracks, and noises from various sources, e.g. switches, magnetic material and power supplies. The frequency variation of the F-2F waveform 402 is conveniently compensated by real-time frequency analysis in the frequency analyzer 310.

In some embodiments, the amplitude variation is accommodated by the amplifier 304 that allows a programmable gain. The peak-to-peak magnitude of the F-2F waveform 402 is normally at a millivolt level, but may vary by two orders of magnitude. A simple amplifier 304 may achieve the goal of amplifying the F-2F waveform to an enhanced signal level that exceeds the noise level while falling within the dynamic range of the overall magnetic stripe reader system 300. However, upon amplification at a large gain, the amplifier F-2F waveform may saturate at a system's headroom, and be clipped. A feedback may be established by incorporating an automatic gain controller (AGC) 316 that adjusts the programmable gain for the amplifier 304 according to a signal level at the output of the amplifier 304. By this means, the magnetic stripe reader 300 may avoid signal saturation and stay within an appropriate operation range.

In certain embodiments, the amplifier 304 is implemented based on a current-mode method, rather than a conventional voltage-mode method, as so to enhance immunity to voltage noises. The current-mode method normally requires less chip estate, while allowing simple implementation of addition, subtraction, division and filtering. In the current-mode configuration, the F-2F waveform 402 is regarded as a differential voltage signal, and first converted to a F-2F current within the amplifier 304. The F-2F current is mirrored and processed differently in subsequent functioning circuits. For instance, in the peak detector 306, the mirrored F-2F current maintains the linearity; and however in the zero-cross detector 308, the mirrored F-2F current may be differentiated or integrated for a quick and accurate detection of zero crossing. Furthermore, switching noises and magnetic stripe noises may be rejected in a power-efficient manner either by using simple current minors for signal delaying, division, addition, and subtraction or by Fourier coefficient transformation of the F-2F current. In addition to the above performance advantages, such adoption of current-mode techniques conveniently avoids a need of extra analog power pins and external components.

Figure 5:
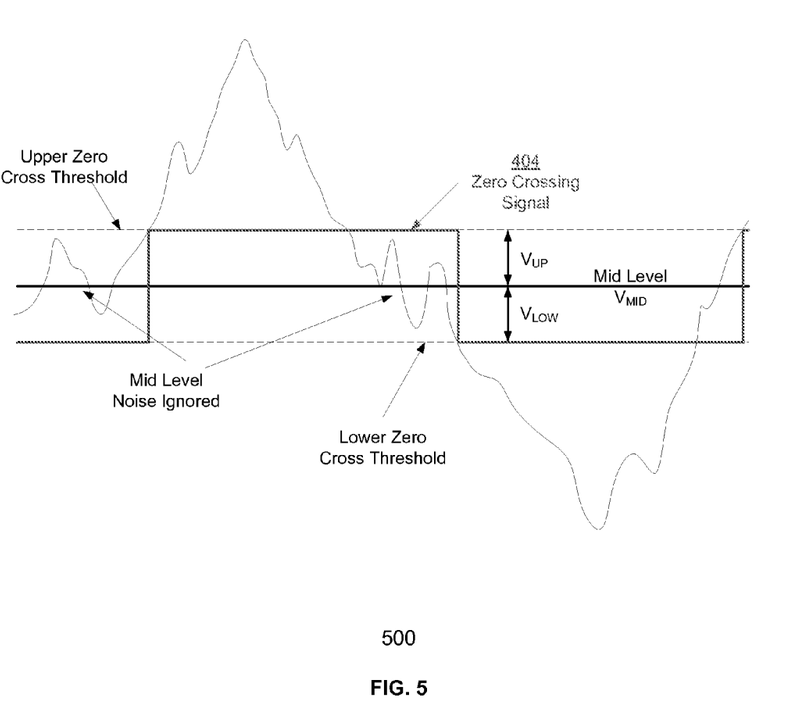
FIG. 5 illustrates an exemplary time diagram of an amplified F-2F waveform in which hysteresis is applied for detecting a mid-level transition point $V_{MID}$ according to various embodiments in the invention.

FIG. 5 illustrates an exemplary time diagram 500 of an amplified F-2F waveform in which hysteresis is applied for detecting zero cross events according to various embodiments in the invention. As it alternates between a peak and a valley, i.e., between a positive and negative flux peak, the F-2F waveform 500 must cross through the mid-level transition point $V_{MID}$ which substantially averages the magnitudes of the adjacent peak and valley. This mid-level transition point $V_{MID}$ is also referred to as a zero-crossing point. However, the F-2F waveform 500 normally involves noises around the mid-level transition point. The zero-cross detector 306 takes into consideration of the noises based on hysteresis, and determines transaction points as the F-2F waveform 500 toggles between adjacent positive and negative flux peaks.

In various embodiments of the invention, an upper zero-cross threshold $V_{HIGH}$ and a lower zero-cross threshold $V_{LOW}$ are determined for zero-cross detection based on hysteresis. In particular, noises around the mid-level transition points are enveloped between the upper and lower zero-cross thresholds. At a rising edge, the transition point is selected at a level of $V_{MID}+V_{HIGH}$ that is raised from the mid-level transition point $V_{MID}$ by the upper zero-cross threshold $V_{HIGH}$. At a falling edge, the transition point is selected at a level of $V_{MID}-V_{LOW}$ that is reduced from the mid-level transition point $V_{MID}$ by the lower zero-cross threshold $V_{LOW}$. As a result, a single transition point is determined at each rising or falling edge, even though the noises around the mid-level transition point may cause multiple zero-cross events.

Although the accuracy of the zero-cross time is not critical, multiple zero-cross detection at each edge of the zero-crossing signal 404 is detrimental to the magnetic stripe reader 300. Offsetting the mid-level transition point effectively overcomes the detrimental noises around the mid-level transition point, and enables a reliable zero-crossing signal 404 at the output of the zero-cross detector 306. In certain embodiments, this zero-crossing signal 404 toggles to high at a rising edge of the F-2F waveform, but to low at a subsequent falling edge.

The F-2F waveform 500 tends to contain more noises around the mid-level transition point. In certain embodiments, current-mode signal processing techniques and configurable zero-cross thresholds are combined to avoid multiple detections at each edge.

Figure 6A:
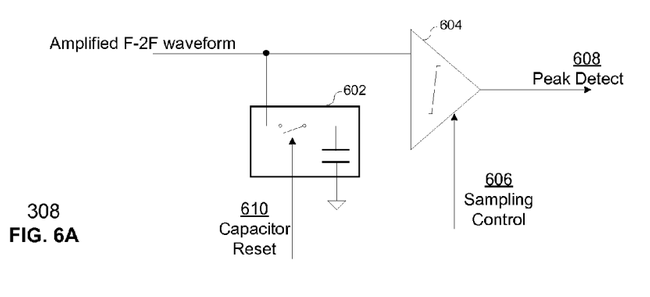
FIG. 6A illustrates an exemplary block diagram of a peak detector according to various embodiments of the invention.
Figure 6B:
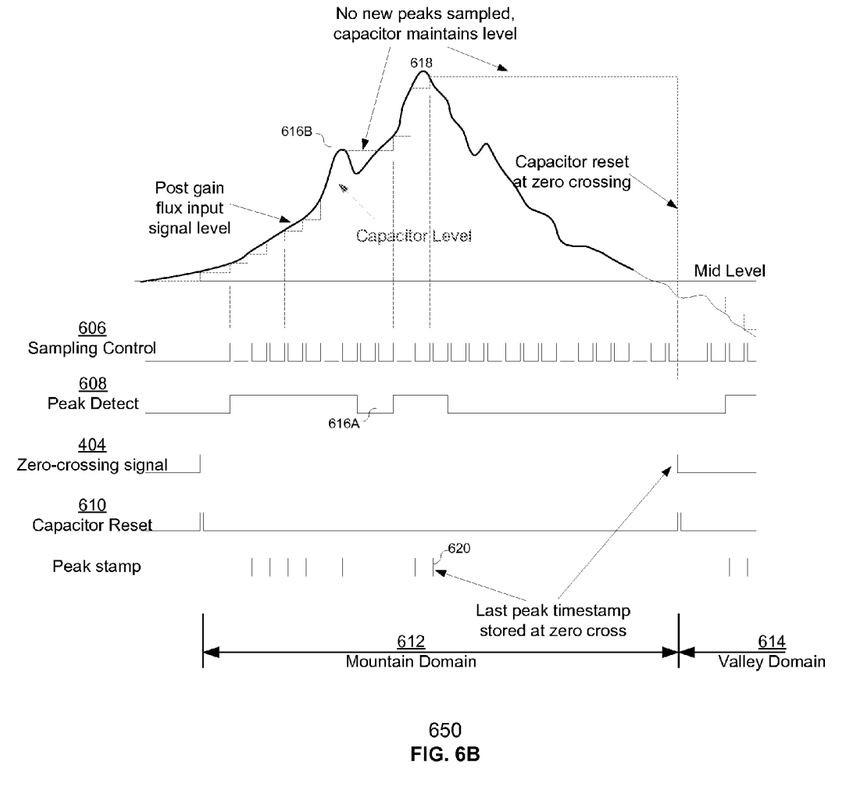
FIG. 6B illustrates time diagrams of corresponding signals during the course of peak detection according to various embodiments of the invention.

FIG. 6A illustrates an exemplary block diagram 308 of a peak detector according to various embodiments of the invention, and FIG. 6B illustrates time diagrams of corresponding signals during the course of peak detection according to various embodiments of the invention. The peak detector 308 comprises a switched capacitor 602 and a sampled comparator 604 both of which are coupled at the output of the amplifier 304. The peak detector 308 is controlled by a periodic sampling control 606, and generates a peak detect output 608. The periodic sampling control 606 comprises multiple sampling pulses timed at a frequency of $f_{SAMPLE}$. The peak detect output 608 tracks the F-2F waveform as it reaches each peak and valley, and particularly in this embodiment, indicates that the F-2F increases towards a peak in each mountain domain and drops towards a valley in each valley domain.

The switched capacitor 602 is reset by a capacitor reset 610, and enabled to hold a first voltage level for determining the peak or valley value in each corresponding mountain or valley domain. The capacitor reset 610 is synchronous to each rising and falling edge of the zero-crossing signal 404 that is provided by the zero cross detector 306, such that the F-2F waveform may be divided to mountain domains 612 and valley domains 614 according to the zero-crossing signal 404. Upon a reset event enabled by the capacitor reset 610, the first voltage is initialized approximately at the mid-level transition point. At each sampling pulse in the periodic sampling control 606, the first voltage may be refreshed to hold an increased voltage level as the F-2F waveform increases to a peak, and a reduced voltage level as the F-2F waveform drops to a valley. This first voltage is used by the comparator 604 as a reference to compare a second voltage that is sampled from the amplified F-2F waveform and determine whether a peak or valley is reached.

In a mountain domain 612 of the F-2F waveform, the peak detect output 608 maintains a high voltage level when the second voltage is higher than that the first voltage at each sampling pulse. When the peak detect output 608 is high, the switched capacitor 602 adopts the second voltage level as the first voltage level for a subsequent sampling pulse. Conversely, when the second voltage is lower than the first voltage, the peak detect output 608 toggles to and remains at a low voltage. When the peak detect output 608 is low, the switched capacitor 602 holds its previous voltage level, i.e., the first voltage level, for a subsequent sampling pulse. Therefore, a high voltage level in the peak detect output 608 is associated with the course of the F-2F waveform increasing to reach the peak 618, and the first voltage held by the switch capacitor 602 increases on the rising edge and maintains the peak voltage level.

This peak detection scheme in FIG. 6B effectively captures glitches on both rising and falling edges of the mountain domain 612, such that these glitches may be differentiated from the actual peak 618 of the F-2F waveform. First of all, the peak detect output 608 is mostly high at the rising edge in the domain 612, except a duration 618A related to a glitch 618B. The F-2F waveform is regarded as reaching a peak 618, only if it is associated with the last sampling pulse when the peak detect output 608 is high in the mountain domain 612. The glitch 618B at the rising edge is hence differentiated from the peak 618 by the duration 618A on the peak detect output 608. Furthermore, the voltage at the peak 618 is stored in the switched capacitor 602. Since any sampled F-2F voltage at the falling edge cannot exceed the voltage at the peak 618, the peak detect output 608 remains low, and the glitches at the falling edge are invisible. As a result, the peak 618 in the F-2F waveform is reliably identified without disturbance from glitches, i.e., the secondary peaks.

In a valley domain 614 of the F-2F waveform, the logic of the comparator has to be reversed because a valley, rather than a peak, is searched for. Conversely, the peak detect output 608 maintains a high voltage when the second voltage is lower than the first voltage held at the switched capacitor 602, and a low voltage when the second voltage is higher than the first voltage. At each sampling pulse, the switched capacitor 602 refreshes its first voltage with the current second voltage when the peak detect output 608 is high, and maintains the first voltage when the peak detect output 608 is low. In a similar manner, the valleys in the F-2F waveform may be reliably identified without disturbance from glitches, i.e., the secondary valleys, within the valley domain 614. In the valley domain 614, a high voltage level in the peak detect output 608 is associated with the course of the F-2F waveform decreasing to reach a valley. The first voltage held by the switch capacitor 602 decreases on the falling edge and maintains a valley voltage level. The mountain and valley domains 612 and 614 are differentiated by the edges and levels of the zero-crossing signal 404.

Figure 7:
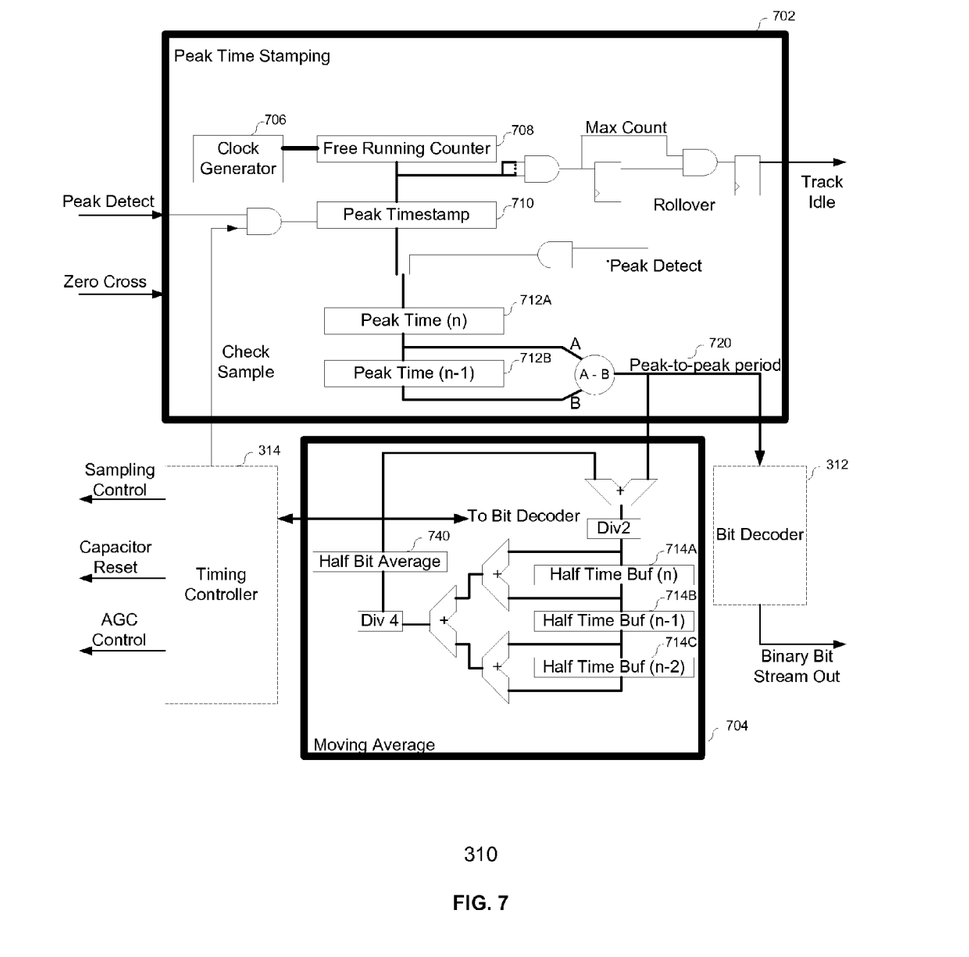
FIG. 7 illustrates an exemplary block diagram of a frequency analyzer according to various embodiments in the invention.

FIG. 7 illustrates an exemplary block diagram 310 of a frequency analyzer according to various embodiments in the invention. The frequency analyzer 310 comprises a peak time stamping unit 702 and a moving average unit 704. The peak stamping unit 310 is coupled to the zero cross detector 306 and the peak detector 308, and generates a peak stamp signal 620 in FIG. 6B and a peak-to-peak period 720. The moving average unit 704 is coupled to the peak time stamping unit 702, averages the peak-to-peak period 720 over multiple peak-to-peak transitions, and generates a half bit average 740. In various embodiments of the invention, the peak-to-peak period 720 and the half bit average 740 are computed and updated at zero crossing points of the F-2F waveform, i.e., at the edges of the zero-crossing signal 404.

The peak time stamping unit 702 includes a clock generator 706, a free-running counter 708 and a peak time stamper 710. The clock generator 706 generates a system clock that may also be provided to the timing controller 314. In certain embodiments, the periodic sampling control 606 is configured from the system clock. The free-running counter 708 is coupled to the clock generator 706, and tracks an absolute time of an event, and particularly, peak times, using the system clock.

The peak time stamper 710 timestamps peaks or valleys according to the system clock that is provided by the timing controller 314. As shown in FIG. 6B, the peak stamp signal 620 is intermediately generated by the peak time stamper 710, and identifies the sampling pulses when the F-2F waveform increases up to the peak 618 in the mountain domain 612, and drops down to its valley in the valley domain 618. A first peak time is stamped at a last pulse of the peak stamp signal 620 within the mountain domain 612, and considered as a true peak in the F-2F waveform. Similarly, a second peak time is stamped at a last pulse within the subsequent valley domain 614, and considered as a true valley. The first and second peak times are tracked according to the system clock by the free running counter 706, and temporarily stored in peak time buffers 712A and 712B. A difference between the first and second times are computed as a transient peak-to-peak period 720 for further use by the bit decoder 312 and the internal moving average unit 704. One of those skilled in the art will see that any two adjacent peak and valley may be stamped, temporarily stored and used to calculate the peak-to-peak period 720 in real time by this means.

The moving average unit 704 compensates frequency variation of the F-2F waveforms by calculating a moving average. The averaging operation is implemented according to a half bit time scale. The unit 704 includes multiple half time buffers 714A-714C that store multiple half bit averages 740 that are generated from previous peak-to-peak transitions. A half bit average 740 is generated from the stored half bit times and the peak-to-peak period 720 that is currently captured. This half bit average 740 may serve as a time base to identify a "F" period and a "2F" period for bit decoder conversion. In some embodiments, the half bit average 740 is also used to adjust a sampling rate of the peak detector 308.

In some embodiments, the half bit average 740 is calculated from the peak-to-peak period 740, the half bit average 740 that is currently held at the output, and the half bit averages previously stored in the buffers 714A-714C according to a bit average method. In one embodiment, the first few bits in the binary information provided by the magnetic stripe have to be formulated according to a specific form, e.g., 0000. In another embodiment, the half bit average 740 is reset at a certain value prior to any processing of the binary information. Regardless, the value of the half bit average 740 is substantially controlled to the "2F" period, i.e., $1/f_{HIGH}$, using the bit average method.

Figure 8:
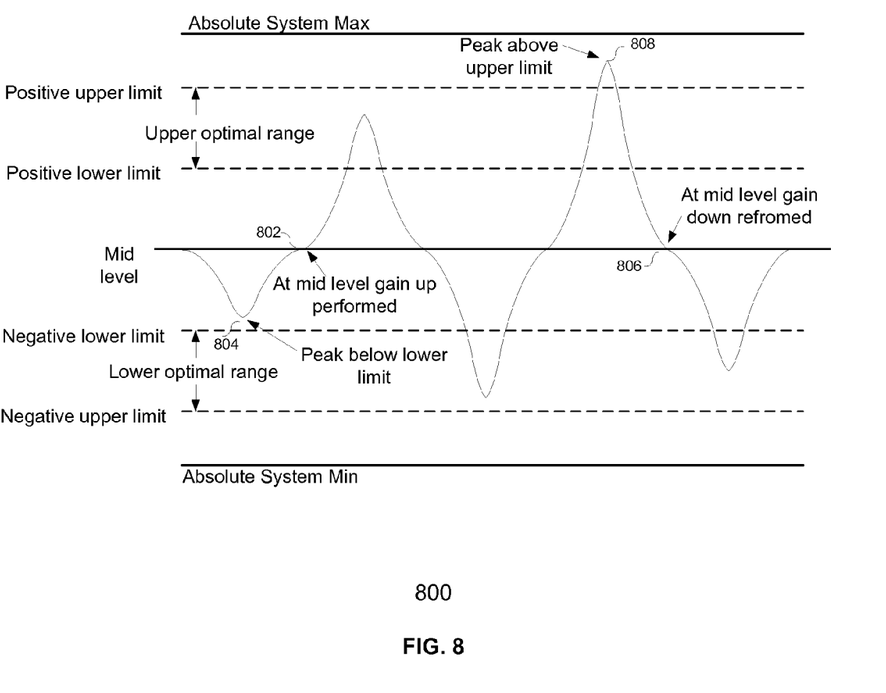
FIG. 8 illustrates an exemplary time diagram of a F-2F waveform based on automatic gain control according various embodiments of the invention.

FIG. 8 illustrates an exemplary time diagram 800 of a F-2F waveform based on automatic gain control according various embodiments of the invention. The AGC 316 monitors the peak voltage levels of the amplified F-2F waveform, and accordingly, makes adjustments to the gain of the amplifier 304. The AGC 316 determines multiple reference voltage levels including a maximum amplitude and a low amplitude threshold. The voltage levels at the peak and valley times are recorded by the AGC 316, and used to determine the mid-level transition point and the amplitude of the F-2F waveform. The amplitude may be determined directly from the peak and valley voltages of the F-2F waveform, or from their respective levels in reference to the mid-level transition point. The AGC 316 reduces the gain, when the amplitude is larger than the maximum amplitude. Similarly, the AGC 316 increases the gain and boosts up the signal level, as the amplitude falls below the low amplitude threshold. In certain embodiments, an optimal upper range and an optimal lower range are defined respectively for the peaks and valleys of the F-2F waveform, and the AGC 316 adjusts the gain, such that the voltage levels of the peaks and valleys are located in the corresponding ranges.

In various embodiments of the invention, the AGC 316 controls the gain as the F-2F waveform crosses the mid-level transition point, i.e., at the zero cross events. In particular, the gain is increased as the F-2F waveform crosses the mid-level transition point 802 at the rising edge, subsequent to a low-voltage valley point 804. Likewise, the gain is reduced as the F-2F waveform crosses the mid-level transition point 806 at the falling edge, subsequent to a high-voltage peak point 808.

Although it may be constructed from separate and independent circuit, the AGC 316 is configured from the peak detector 308, the zero cross detector 306 and/or the frequency analyzer 310. The voltage levels at the peaks and valleys are held at the switched capacitor 602 in the peak detector 308, and may be re-used for gain control in the AGC 316 as well. The AGC 316 determines an appropriate gain according to these peak and valley voltage levels in view of its predetermined reference voltages, and further enables this gain when the zero cross detector 306 identifies the crossing points. As a result, the amplifier 304 may provide a high-quality F-2F waveform quickly based on such automatic gain control.

Peak detection and automatic gain control are controlled by the timing controller 314. The timing controller 314 is coupled to the frequency analyzer 310, and receives the periodic sampling control 606. In certain embodiments, the clock generator 706 may be included in the timing controller 314, and the sampling control 606 is provided to the frequency analyzer 310 for use by the counter 708. The time controller 314 further generates the sampling control 606, an AGC control, and a capacitor reset 610, and these signals are synchronized according to the sampling control 606. The sampling control 606 is used in the peak detector 308 for sampling the voltage of the F-2F waveform. The AGC control is applied to enable gain control, and the capacitor reset 610 is used to reset the switch capacitor 602 in the peak detector 308 upon zero-crossing detection.

In one embodiment, the sampled comparator 604 included in the peak detector 308 is plagued by a comparator offset that may result in false peak detection. Upon oversampling, the signal variation between two consecutive samples may not be sufficient to overcome the comparator offset, and thus, no peak or an erroneous peak may be detected for the F-2F waveform. Although the offset is less detrimental upon undersampling, the comparator may still be associated with inaccurate peak detection. Such inaccuracy unavoidably leads to a jitter in the peak-to-peak period 720 in addition to jitter noises from other sources, such as the magnetic stripe. When an overall jitter exceeds a threshold jitter, it results in erroneous decoding of the stream of data bits by the bit decoder 312.

Figure 9:
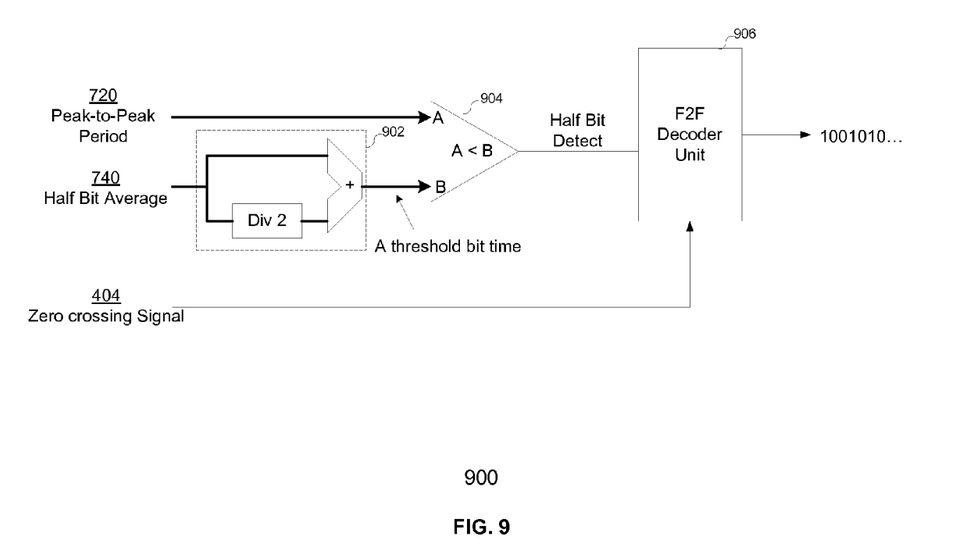
FIG. 9 illustrates an exemplary block diagram of a bit decoder according to various embodiments of the invention.

FIG. 9 illustrates an exemplary block diagram of a bit decoder 312 according to various embodiments of the invention. The bit decoder 312 is coupled to the frequency analyzer 310, and receives the peak-to-peak period 720 and the half bit average 740. The half bit average 740 is scaled in a scaler 902 to provide a threshold bit time. In a preferred embodiment, the half bit average 740 is scaled by one and half times, such that the threshold bit time is set in between of the "F" period and the "2F" period. One of those skilled in the art may see that this scaler 902 may be integrated with the moving average unit 704 in the frequency analyzer 310, such that a threshold bit time is directly provided to the bit decoder for differentiating a "F" period and a "2F" period.

Thereafter, each peak-to-peak period 720 is compared with the threshold bit time in a comparator 904. When the peak-to-peak period 720 is larger than the threshold bit time, a "F" period is detected; otherwise, a "2F" period is detected. A F2F decoder 906 is controlled by the zero-crossing signal 404 provided by the zero cross detector 306. At each zero-crossing of the F-2F waveform, the F2F decoder 906 outputs a high voltage (a binary data of "0") upon detecting one "F" period, and a low voltage (a binary data of "1") upon detecting two consecutive "2F" periods. As a result, the bit decoder 312 generates a time-multiplexed stream of data that is recovered from the data stored in the magnetic stripe 350.

Figure 10:
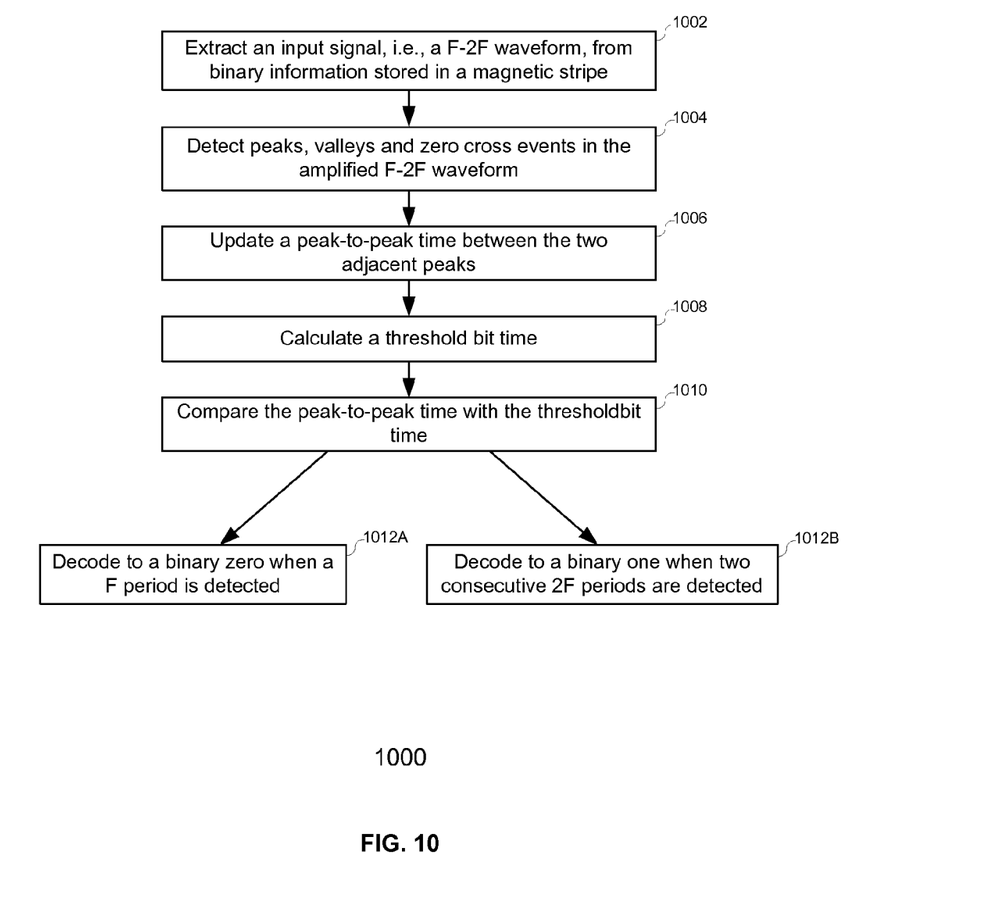
FIG. 10 illustrates an exemplary method of magnetic stripe reading according to various embodiments in the invention.

FIG. 10 illustrates an exemplary method 1000 of magnetic stripe reading according to various embodiments in the invention. At step 1002, an input signal is extracted from a magnetic stripe according to binary information stored on the stripe. In certain embodiments, the input signal has been amplified by an adjustable gain, such that the amplified signal is controlled to a preferred range. The input signal alternates between peaks and valleys at substantially two frequencies, $f_{HIGH}$ and $f_{LOW}$. The high frequency $f_{HIGH}$ approximately doubles the low frequency $f_{LOW}$. Therefore, the input signal or the amplified input signal is also referred to as a F-2F waveform.

At step 1004, peaks, valleys and zero cross events, i.e., mid-level transition points, are detected in the amplified F-2F waveform. In some embodiments, a periodic sampling control is applied to monitor the level of the amplified F-2F waveform. In the mountain domain, the waveform is time stamped along the rising edge, while in the valley domain, it is time stamped along the falling edge. In particular, a peak stamp signal is enabled during the periodic sampling control for a time stamping purpose. Any last pulse in the peak stamp signal prior to a subsequent zero cross event is regarded as a peak or a valley.

At step 1006, a peak-to-peak time is calculated and updated according to adjacent peaks. At step 1008, a threshold bit time is generated by processing multiple peak-to-peak times. These peak-to-peak times are associated with the F-2F waveform at various times, and stored in buffers. These peak-to-peak times are averaged and scaled to the threshold bit time, such that the bit time is set in between a "F" period and a "2F" period. At step 1010, the peak-to-peak time is compared to the threshold bit time. In a preferred embodiment, the peak-to-peak time and the threshold bit time are calculated and compared at each zero cross event.

At step 1012A, a "F" period at the frequency of $f_{LOW}$ is determined for the peak-to-peak time, and a binary data of "1" is outputted. At step 1012B, two "2F" periods at the frequency of $f_{HIGH}$ is determined for the peak-to-peak time, and a binary data of "0" is outputted. As a result, a data stream of binary bits is time-multiplexed and provided based on the F-2F waveform recovered from the magnetic stripe.

One of those skilled in the art knows that the peak-to-peak time refers to a peak-to-valley time or a valley-to-peak time. A valley of a F-2F waveform may be broadly regarded as a negative flux peak, such that the peak-to-peak time may be broadly adopted to describe both the peak-to-valley time and the valley-to-peak time in this invention.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A magnetic stripe reader, comprising:
   a stripe interface, coupled to generate a F-2F waveform from binary information stored in a magnetic card;
   a zero-cross detector, coupled to the stripe interface, the zero-cross detector detecting a plurality of zero cross events when the F-2F waveform crosses a mid-level transition point located between each adjacent peak and valley pair;
   a peak detector, coupled to the stripe interface, the peak detector generating a peak detect output to track the F-2F waveform as it reaches each peak and valley;
   a frequency analyzer, coupled to the zero-cross and peak detectors, the frequency analyzer calculating a plurality of peak-to-peak periods for a plurality of adjacent peak and valley pairs, and deriving a bit time based on the plurality of peak-to-peak periods; and
   a bit decoder, coupled to the frequency analyzer, the bit decoder generating a stream of digital data according to the plurality of peak-to-peak periods and the bit time.

2. The magnetic stripe reader according to claim 1, further comprising:
   a timing controller, coupled to the peak detector and the frequency analyzer, the timing controller synchronizing the peak detector, the zero-cross detector and the frequency analyzer.

3. The magnetic stripe reader according to claim 1, further comprising:
   an amplifier, coupled to the stripe interface, the amplifier amplifying the F-2F waveform by a gain prior to zero cross detection and peak detection.

4. The magnetic stripe reader according to claim 3, further comprising:
   an automatic gain controller, coupled to the amplifier, the automatic gain controller receiving the amplified F-2F waveform at the output of the amplifier and controlling the gain according to the level of the amplified F-2F waveform.

5. The magnetic stripe reader according to claim 3, wherein the amplifier, the peak detector and the zero-cross detector are implemented using current-mode techniques.

6. The magnetic stripe reader according to claim 1, wherein the F-2F waveform alternates between peaks and valleys at two frequencies including a first frequency and a second frequency that doubles the first frequency, and wherein a peak-to-peak period at the first frequency is associated with a bit of "1" and two consecutive peak-to-peak periods at the second frequency is associated with a bit of "0".

7. The magnetic stripe reader according to claim 6, wherein the bit time is derived according to a bit average method, such that the bit time may be scaled to substantially smaller than a first peak-to-peak time associated with the first frequency and larger than a second peak-to-peak time associated with the second frequency.

8. The magnetic stripe reader according to claim 1, wherein the frequency analyzer calculates each of the plurality of peak-to-peak periods for a corresponding adjacent peak and valley pair, and updates the bit time at a zero cross event immediately following the corresponding adjacent peak and valley pair.

9. The magnetic stripe reader according to claim 1, wherein the peak detect output indicates that the F-2F waveform increases towards a peak in a mountain domain and drops towards a valley in a valley domain, and a secondary noisy peak is accordingly differentiated from the peak in each mountain domain of the F-2F waveform.

10. The magnetic stripe reader according to claim 1, wherein the plurality of zero cross events is detected based on hysteresis using an upper zero-cross threshold and a lower zero-cross threshold to adjust the mid-level transition point and accommodate noises around the mid-level transition point, a first subset of the plurality of zero cross events being detected at a plurality of rising edges of the F-2F waveform when the voltage of the F-2F waveform is larger than the mid-level transition point by the upper zero-cross threshold, a second subset of the plurality of zero cross events being detected at a plurality of falling edges of the F-2F waveform when the voltage of the F-2F waveform is smaller than the mid-level transition point by the lower zero-cross threshold.

11. The magnetic stripe reader according to claim 1, wherein the frequency analyzer further comprising:
    a clock generator that generates a clock, the clock being further used for sampling control in the zero cross detector, and peak and valley stamping in the peak detector; and
    a free running counter, coupled to the clock generator, the free running counter tracking the peaks and valleys in the F-2F waveform for calculating the plurality of peak-to-peak periods.

12. The magnetic stripe reader according to claim 1, wherein the zero-cross detector further comprising:
    a comparator that is controlled by a periodic sampling control to compare a voltage sampled from the F-2F waveform to a tentative peak value; and
    a switched capacitor that holds the tentative peak value and updates the tentative peak value according to the voltage sampled from the F-2F waveform as the F-2F waveform increases towards the peak in each mountain domain and drops towards the valley in each valley domain.

13. A method of reading a magnetic stripe, comprising the steps of:
    extracting a F-2F waveform according to binary information stored in the magnetic card;
    detecting a plurality of zero cross events when the F-2F waveform crosses a mid-level transition point located between each adjacent peak and valley pair;
    tracking a plurality of peaks and valleys in the F-2F waveform;
    calculating a plurality of peak-to-peak periods for a plurality of adjacent peak and valley pairs;
    deriving a bit time based on the plurality of peak-to-peak periods, the bit time being used to differentiate a bit of "1" and a bit of "0"; and generating a stream of digital data according to the plurality of peak-to-peak periods and the bit time.

14. The method according to claim 13, wherein the F-2F waveform alternates between peaks and valleys at two frequencies including a first frequency and a second frequency that doubles the first frequency, and wherein a peak-to-peak period at the first frequency is associated with a bit of "1" and two consecutive peak-to-peak periods at the second frequency is associated with a bit of "0".

15. The method according to claim 13, wherein the bit time is updated at a zero cross event immediately following each adjacent peak and valley pair.

16. The method according to claim 13, wherein the step of tracking a plurality of peaks and valleys in the F-2F waveform is associated with a peak detect output that indicates the F-2F waveform increases towards a peak in a mountain domain and drops towards a valley in a valley domain, and a secondary noisy peak is differentiated from the peak in each mountain domain of the F-2F waveform.

17. The method according to claim 13, wherein the plurality of zero cross events is detected based on hysteresis using an upper zero-cross threshold and a lower zero-cross threshold to adjust the mid-level transition point and accommodate noises around the mid-level transition point, a first subset of the plurality of zero cross events being detected at a plurality of rising edges of the F-2F waveform when the voltage of the F-2F waveform is larger than the mid-level transition point by the upper zero-cross threshold, a second subset of the plurality of zero cross events being detected at a plurality of falling edges of the F-2F waveform when the voltage of the F-2F waveform is smaller than the mid-level transition point by the lower zero-cross threshold.

18. A method of converting a F-2F waveform to a stream of digital data, comprising the steps of:
tracking a plurality of peaks and valleys in the F-2F waveform, the F-2F waveform alternating between peaks and valleys at two frequencies including a first frequency and a second frequency that doubles the first frequency;
calculating a plurality of peak-to-peak periods for a plurality of adjacent peak and valley pairs;
deriving a bit time based on the plurality of peak-to-peak periods, the bit time being used to differentiate a bit of "1" and a bit of "0"; and
generating the stream of digital data according to the plurality of peak-to-peak periods and the bit time, wherein a peak-to-peak period at the first frequency is associated with a bit of "1" and two consecutive peak-to-peak periods at the second frequency is associated with a bit of "0".

19. The method according to claim 18, wherein the step of tracking a plurality of peaks and valleys in the F-2F waveform is associated with a peak detect output that indicates the F-2F waveform increases towards a peak in a mountain domain and drops towards a valley in a valley domain, and a secondary noisy peak is differentiated from the peak in each mountain domain of the F-2F waveform.

20. The method according to claim 18, wherein a plurality of zero cross events is detected between the plurality of adjacent peak and valley pairs based on hysteresis, an upper zero-cross threshold and a lower zero-cross threshold being used to adjust a mid-level transition point and accommodate noises around the mid-level transition point, a first subset of the plurality of zero cross events being detected at a plurality of rising edges of the F-2F waveform when the voltage of the F-2F waveform is larger than the mid-level transition point by the upper zero-cross threshold, a second subset of the plurality of zero cross events being detected at a plurality of falling edges of the F-2F waveform when the voltage of the F-2F waveform is smaller than the mid-level transition point by the lower zero-cross threshold.

* * * * *